United States Patent

Blaschek et al.

Patent Number: 5,285,225
Date of Patent: Feb. 8, 1994

[54] MOTION PICTURE CAMERA WITH COMPLETE OR PARTIAL FRAME SUPERIMPOSITION

[75] Inventors: Otto Blaschek, Aschheim; Karl-Heinz Schwank; Thomas Popp, both of Munich, all of Fed. Rep. of Germany

[73] Assignee: Arnold & Richter Cine Technik GmbH & Co. Betriebs KG, Munich, Fed. Rep. of Germany

[21] Appl. No.: 491,743
[22] PCT Filed: Jul. 14, 1989
[86] PCT No.: PCT/DE89/00476
§ 371 Date: May 20, 1991
§ 102(e) Date: May 20, 1991
[87] PCT Pub. No.: WO90/00758
PCT Pub. Date: Jan. 25, 1990

[30] Foreign Application Priority Data

Jul. 15, 1988 [DE] Fed. Rep. of Germany ....... 3824049

[51] Int. Cl.$^5$ ............................................. G03B 19/18
[52] U.S. Cl. ......................................... 352/93; 352/90; 352/131; 352/133
[58] Field of Search .................... 352/90, 93, 131, 133

[56] References Cited

U.S. PATENT DOCUMENTS

| | | |
|---|---|---|
| 1,143,522 | 6/1915 | Faber . |
| 1,593,967 | 7/1926 | Debrie ............................... 352/93 |
| 1,907,253 | 5/1933 | Debrie ............................... 352/90 |
| 2,250,442 | 7/1941 | Abell . |
| 2,907,253 | 10/1959 | McDonald . |
| 2,916,977 | 12/1959 | St. George ........................ 352/93 |
| 3,111,887 | 11/1963 | Alexander . |
| 3,952,319 | 4/1976 | Hirata et al. ..................... 352/93 |
| 4,422,745 | 12/1983 | Hopson . |

FOREIGN PATENT DOCUMENTS

| | | |
|---|---|---|
| 2412492 | 10/1974 | Fed. Rep. of Germany . |
| 167370 | 8/1921 | United Kingdom ............... 352/90 |

Primary Examiner—Monroe H. Hayes
Attorney, Agent, or Firm—Fish & Richardson

[57] ABSTRACT

Motion-picture camera with a taking optics for projecting frames onto a motion-picture film, moved by means of a film transport mechanism along a film path. In addition, in the vicinity of the film path a frame-projection device (16) is located to project an additional frame (32) onto motion-picture film (3) and/or to superimpose a partial frame (36, 37) on frame (31) exposed or to be exposed by taking optics (15).

11 Claims, 5 Drawing Sheets

MOTION PICTURE CAMERA WITH COMPLETE OR PARTIAL FRAME SUPERIMPOSITION

The invention relates to a motion-picture camera with taking optics for projecting frames onto motion-picture film advanced along a film path by a film transport mechanism, and with an additional frame projection device located in the vicinity of the film path.

It is known that additional information can be projected onto the frames projected onto motion-picture film by taking optics while making motion-picture films using a motion-picture camera. The additional information consists of alphanumeric, alphabetical, or numerical data, usually projected onto the upper or lower edge of the frame. The data are reflected electronically, using light-emitting diodes, optical fibers or the like, located in the vicinity of the film plane and controlled electronically.

A keyboard mounted on the motion-picture camera is used for data entry, but this keyboard can also be provided separately and the corresponding data transmitted from it to the motion-picture camera through an interface. However, data superimposed on parts of a film exposed by the taking optics of the motion-picture camera are insufficient for comprehensive displays, especially in medical technology and for animation.

German A 24 12 492 teaches a motion-picture camera with a taking optics for projecting frames onto a motion-picture film, said camera having an additional device for recording data such as time, serial numbers, code numbers, or the like onto the motion-picture film. With the camera shutter open, the frame is simultaneously projected onto the motion-picture film by a digital entry device via an image amplifier for projecting frames onto the motion-picture film.

The digital entry device consists of a digital display circuit, optically connected by an optical system with the film gate of the motion-picture camera, with a control circuit located ahead of the digital display circuit, said control circuit being connected to an analog signal source. Consequently, analog signals in digital form can be projected onto the motion-picture film via an analog/digital converter and a scanning and holding circuit as digital signals with the aid of semiconductor display numbers onto the motion-picture film.

In a data and signal superimposition method known from German A 24 12 492, data reflection and projection of an x-ray are accomplished by means of a cathode ray tube and an optical system as well as via a single film gate, but only limited information superimposition is possible, since the additional information projected in digital form is superimposed onto a limited portion of the frame. For this purpose, to record the actual (x-ray) image, a portion of the frame must be screened so that the digital additional information can be superimposed onto these parts of the frame.

German A 28 11 289 teaches a motion-picture camera with a device for recording additional information onto a motion-picture film, with the display from an optical information output device with a screen image being reflected into the taking beam of the motion-picture camera via recording optics. A switchable mirror is located in the reflecting path, said mirror alternately projecting the additional information onto the motion-picture film and reflecting a finder image into the finder of the motion-picture camera. Consequently, the reflected information can be observed in the finder of the motion-picture camera.

Reflection of the additional information thus takes place via the finder of the motion-picture camera using a reflecting beam path, so that separate recording of the frame and the additional information and possibly separate observation of the photographed object and the additional information is not possible.

German A 30 31 100 teaches a method and a device for projecting information onto a motion-picture film, with the information being entered via a function keypad into a microcomputer connected with the film camera, stored, and converted into light pulses by the triggering process of the film camera, said pulses being emitted by an LED strip through optical fibers onto the motion-picture film in the cassette or reel area of the motion-picture camera. In this manner, film titles and other additional inputs can be projected in digitized form as an information line onto the motion-picture film as a supplement to the actual frame, in the manner of a data reflection.

Consequently, a second separate frame exposure is not performed, but only a reflection of additional information onto the frames already taken; this of course limits the information content of the superimposed additional information.

The goal of the present invention is to provide a motion-picture camera of the species mentioned at the outset, which permits comprehensive information in addition to the frames exposed through the taking optics of the camera to be superimposed onto the motion-picture film in the motion-picture camera and recorded onto the motion-picture film, whose content can correspond to a complete frame.

The solution according to the invention also makes it possible to superimpose and project information onto the motion-picture film in addition to alphanumeric data, said information extending from graphs and curves to complete additional frames. The additional frames can be electronically processed frames obtained from frames taken by the taking optics of the motion-picture camera. In this manner, in addition to animation, increasing contrast, filtering out certain information by addition or subtraction of certain image components, and the like are possible.

In the solution, therefore, a second projection of additional information separate from the projection of the frame onto the motion-picture film takes place, and there is no superimposition as in the subject of the known data reflections.

As a result of the separate projection of the additional information through a second frame window, the information content can be considerably increased relative to known data reflections and a plurality of individual information, for example rows of digits, text entries, graphic representations, and frame recording and frame developing data can be included.

One special area of application of full format superimposition is medical technology, with a great deal of additional information being stored on a motion-picture film serving to facilitate diagnosis, documentation, and processing of the film.

Thus, for example, in addition to the x-ray photographs taken with the motion-picture camera, patient-specific data, curves, or graphs as well as frames taken with a video camera and processed electronically can be superimposed directly onto the motion-picture film so that a variety of information can be stored continuously on the motion-picture film for a reliable diagnosis without the danger of information being lost or confused as the result of additional notes added to the motion-picture film.

One advantageous embodiment of the solution according to the invention is characterized by the additional frame or partial frame being projected onto the motion-picture film during each film transport step.

In this manner, time-synchronized storage of the frames taken by the motion-picture camera with the superimposed frames from the additional frame projection device can be achieved, so that for example an x-ray that has already been recorded can be combined in real time with the corresponding EKG pulses or other current data recorded when examining a patient.

In one advantageous improvement on the invention, the frame projection device consists of a second taking optics or a picture monitor, with a beam guide system being located between the picture monitor and/or the taking optics and the location of the projection of the additional frame on the motion-picture film. To screen out the second frame during film transport, an additional diaphragm device is required in conjunction with a second taking optics, while when a picture monitor is used, the latter can be blanked during the movement phase of the motion-picture film.

By providing a beam guide system, the second complete frame or partial frame can be superimposed onto an optimum location in the vicinity of the film path so that essentially no changes need be made in the film transport mechanism or the film path.

Another advantageous embodiment of the solution according to the invention is characterized by the picture monitor being connected by an electrical lead with a second taking device, preferably a video camera, with a video tape recorder, video disk recorder and/or a digital memory located between the video camera and the picture monitor, so that image information can be transmitted directly via the video camera or from the memory or memories, to the monitor.

Another advantageous embodiment of the solution according to the invention is characterized by a balancing circuit to adjust the brightness of the picture monitor, said circuit containing a photodiode mechanically pivotable in front of the picture monitor, the output of said photodiode being connected with one input of a comparator, whose other input is connected with a standard voltage source and whose output, together with the output of a timing oscillator, is connected to one input of a resettable counter for triggering the balancing procedure, the output of said counter controlling a brightness adjusting element for the picture monitor through a digital/analog converter and an amplifier.

This additional arrangement allows brightness balancing, so that the additional frames projected onto the motion-picture film will have a desired degree of brightness corresponding to the brightness levels provided by the taking optics of the motion-picture camera. In addition, aging effects of the monitor can be compensated in this manner.

Advantageous improvements on the invention are characterized in the subclaims or are described in greater detail below together with the description of the preferred embodiment of the invention, with reference to the figures.

Figure 1:
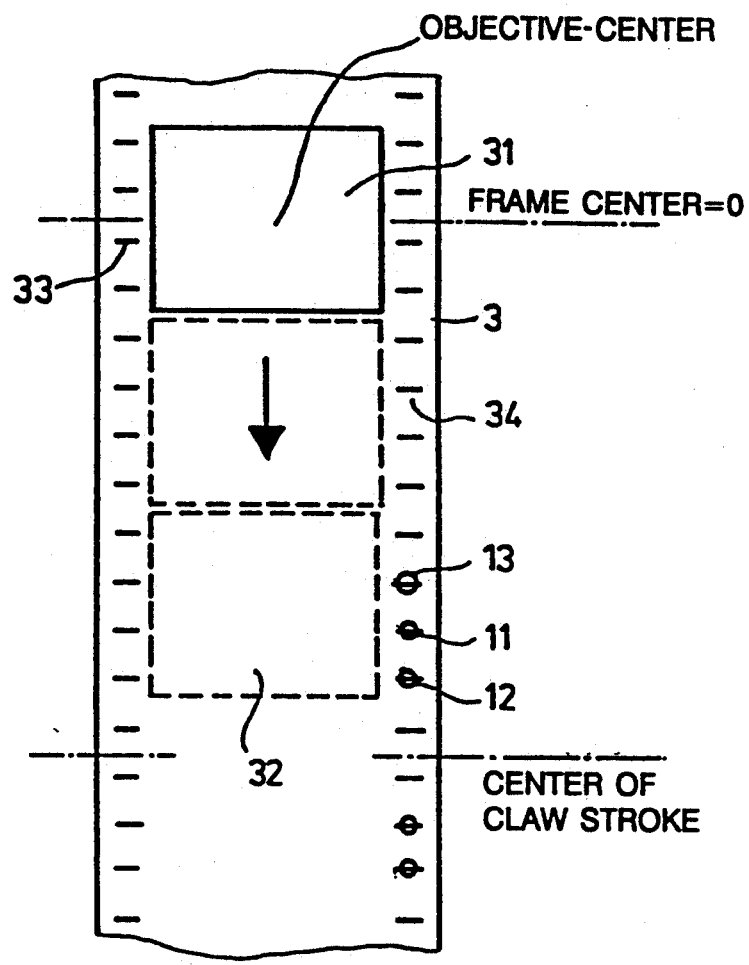
FIG. 1 is a top view of a motion-picture film in the vicinity of the film path of a motion-picture camera.

FIG. 1 is a top view of a motion-picture film 3, provided with two rows of holes 33 and 34 running in the transport direction, said holes being engaged by a claw with gripping tips 11, 12 as well as a register pin with a register pin tip 13 to improve image quality, for intermittent film transport.

Between rows of holes 33 and 34, frames are projected, with a corresponding taking optics being located perpendicular to the plane of the drawing and a first frame 31 is projected onto motion-picture film 3. Frame projection takes place in a manner known of itself while the film is at rest, when the diaphragm opening of a rotating rotary shutter 14 according to FIG. 3 clears the beam path from the recording optics to motion-picture film 3.

According to the invention, an additional complete or partial frame 32 superimposed in the transport direction of the film, indicated by the arrow, ahead of first frame 31; in the case of a complete frame, approximately the same area is exposed as in the case of first frame 31, while in the case of a partial frame, corresponding areas of the complete frame are blocked out.

Alternatively to the exposure of additional frames onto a motion-picture film 3, shown in FIG. 1, partial exposures onto first frame 31 can also be carried out in a subsequent transport step of the film transport mechanism in the vicinity of the second frame 32 using the corresponding frame projection device.

In the embodiment shown in FIG. 1, superimposition of second frame 32 in the vicinity of the film transport mechanism takes place in the direction of travel of the film before the middle of the stroke of the claw, whose tips 11, 12 engage adjacent holes and transport the film in the direction of the arrow in a selectable transport step. The advance of motion-picture film 3 depends on the size of the frame gap left between the frames and on whether a second frame 32 is to be projected simultaneously with first frame 31 onto motion-picture film 3, or whether partial superimpositions onto the first frame taken by the taking optics of the motion-picture camera are to take place.

A somewhat smaller area in a direction transverse to the transport direction of motion-picture film 3 may be available for installing the film transport mechanism, possibly for superimposing second frame 32, so that second frame 32 is projected onto a slightly smaller area of motion-picture film 3. Thus, under certain conditions, when working with 35 mm film, the size of a frame projected by the taking optics of the motion-picture camera may be 18×24 mm, while additional frame 32 measures 18×22-23 mm.

Figure 2:
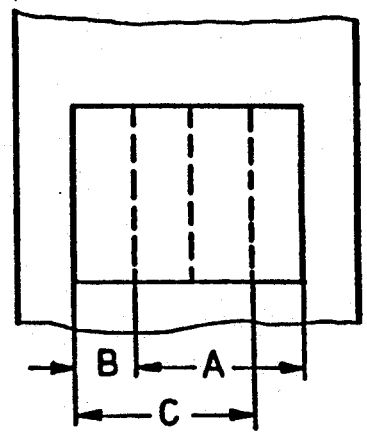
FIG. 2 is a portion of the motion-picture film with various frame positions.

FIG. 2 shows ways of projecting complete and partial frames, in schematic form.

While the frame taken by the taking optics of the motion-picture camera in a 35 mm film requires the entire area measuring 18×24 mm, an accompanying information area B can be provided as a partial frame, projected at the position of the second frame onto motion-picture film 3 as shown in FIG. 1 or onto the first frame 31 taken by the taking optics of the camera. Complete frame superimposition of data can occur in area C, while for example a processed frame is recorded in area A. The first frame taken through the taking optics of the motion-picture camera can also be located in area A. Of course, a first frame can also be provided in the area covering areas A and B.

Figure 3:
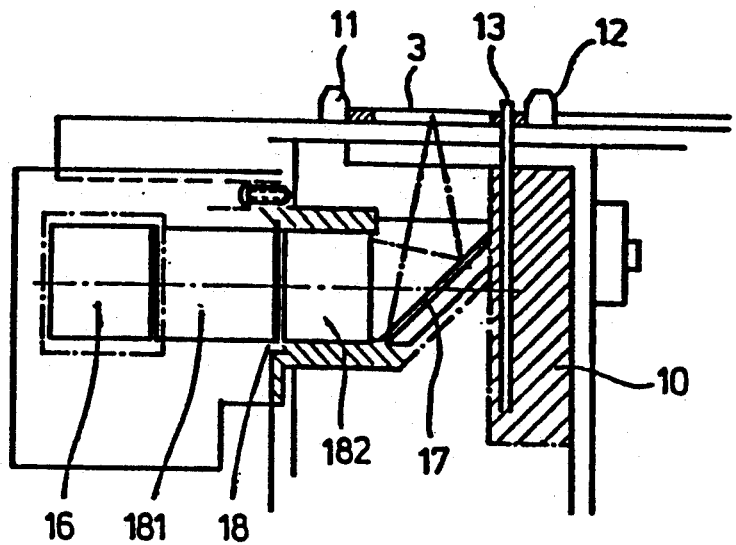
FIG. 3 is a cross section through the transport mechanism of a motion-picture camera with a beam guide system for superimposing a complete or partial frame.
Figure 4:
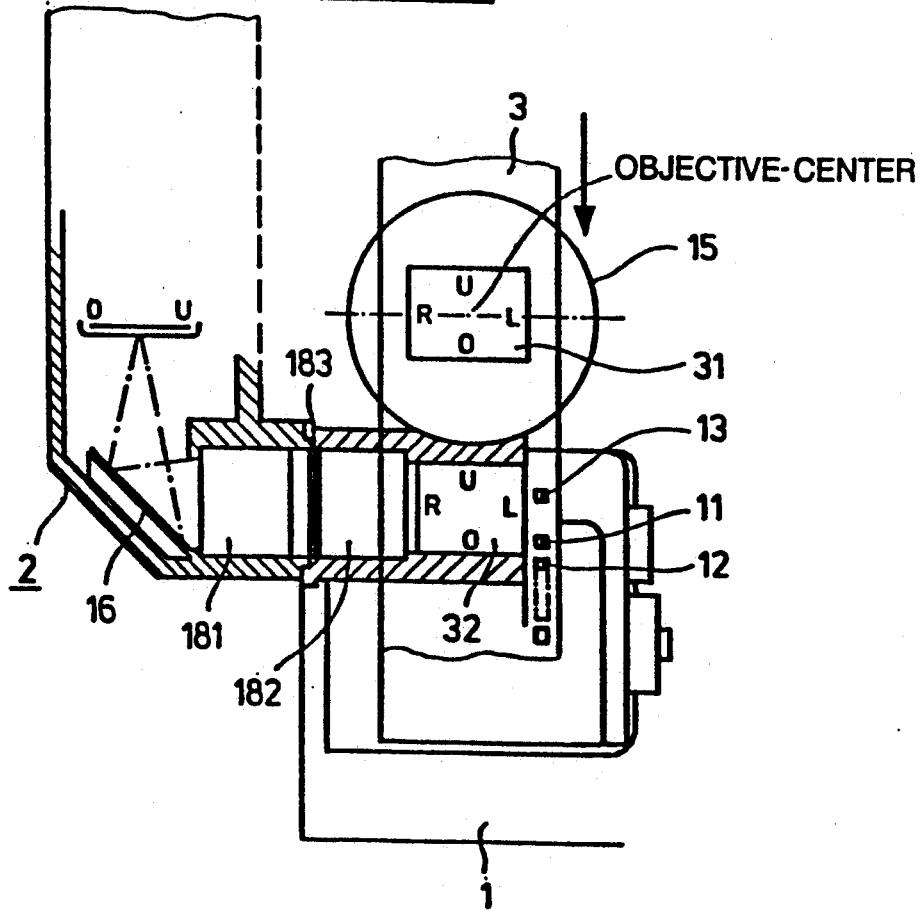
FIG. 4 is a top view of the transport area of a motion-picture camera with a beam guide system and a monitor for projecting an additional complete or partial frame.

FIGS. 3 and 4 show the transport mechanism, taking optics, and frame projection device of a motion-picture camera with second-frame superimposition, in cross section through or in a top view of the film path.

The cross section through the film transport mechanism shown in FIG. 3, with second-frame superimposition, shows, in the vicinity of the film plane, claw tips 11, 12 that engage the film holes, register pin tip 13, and claw 10. In the vicinity of the path of movement of claw 10, a deflecting mirror 17 is provided to direct the beams emerging from a lens 18 onto motion-picture film 3.

An additional deflecting mirror 16 is located at the beam entrance to lens 18; the side designations shown on the deflecting mirror are used to characterize the frame position.

Of course, direct second-frame superimposition is possible without providing deflecting mirrors, and can be performed by analogy with the remarks above.

FIG. 4 shows a top view of the film transport mechanism with second-frame superimposition, in other words a view rotated through 90° relative to the view shown in FIG. 3.

Motion-picture film 3 is transported in the direction indicated by the arrow by means of the film transport mechanism consisting, in the embodiment shown, of claw 10 and register pin 13. It is moved beneath taking optics 15 of the motion-picture camera, whereupon a first frame 31 is projected onto motion-picture film 3.

In the vicinity of the path of movement of film transport mechanism 10, 13 of the motion-picture camera, a second frame 32 is projected in the same frame position onto motion-picture film 3. For this purpose a picture monitor 19 is used, whose screen is set to face a first deflecting mirror 16 that directs the beams emerging from the screen of picture monitor 19 onto a lens 18, whose output faces motion-picture film 3 through second deflecting mirror 17.

Lens 18 consists of two lens systems 181, 182, divided at an interface 183. This makes it possible to mount monitor part 2 on the actual camera body of motion-picture camera 1 and for example to replace it by another monitor part with a higher resolution or to replace a black and white monitor by a color monitor.

Figure 5:
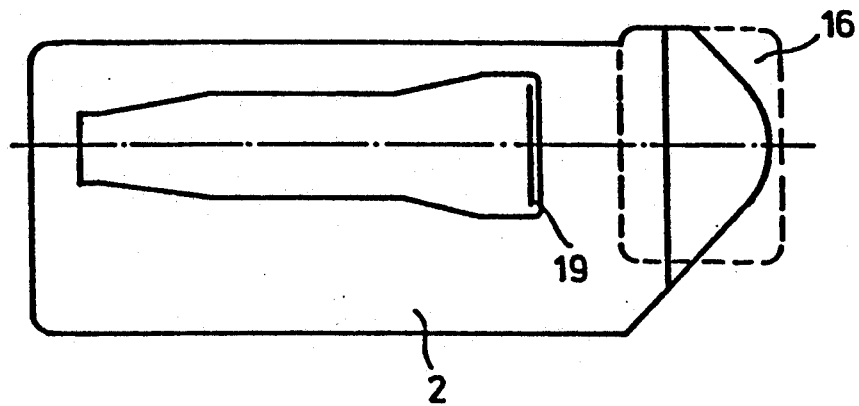
FIG. 5 is a section through the monitor according to FIG. 4.

FIG. 5 shows a lengthwise section through monitor part 2 with the actual picture monitor 19 and the first deflecting mirror 16 associated with lens system 181 of lens 18. The monitor part constitutes a separate structural unit whose terminals fit corresponding terminals in the motion-picture camera so that a standardized replacement of this part can be made depending on the requirements and established needs. Monitor part 2 has electrical connections for transferring the BAS signal, to adjust the brightness, and to blank the image tube on monitor 19. A power supply is also provided which can be connected to the power supply of the motion-picture camera.

Picture monitor 19 is preferably a monitor with a one-inch picture tube optionally designed as a high-resolution or normal-resolution monitor tube.

Normal television picture tubes are used as picture tubes, but provided with a modified image deflection circuit, since monitor 19 must be blanked during film transport. The frame rate pulse period is preset by the maximum diaphragm opening time of the motion-picture camera. The line deflection periods remain the same as in normal television deflection.

Figure 6:
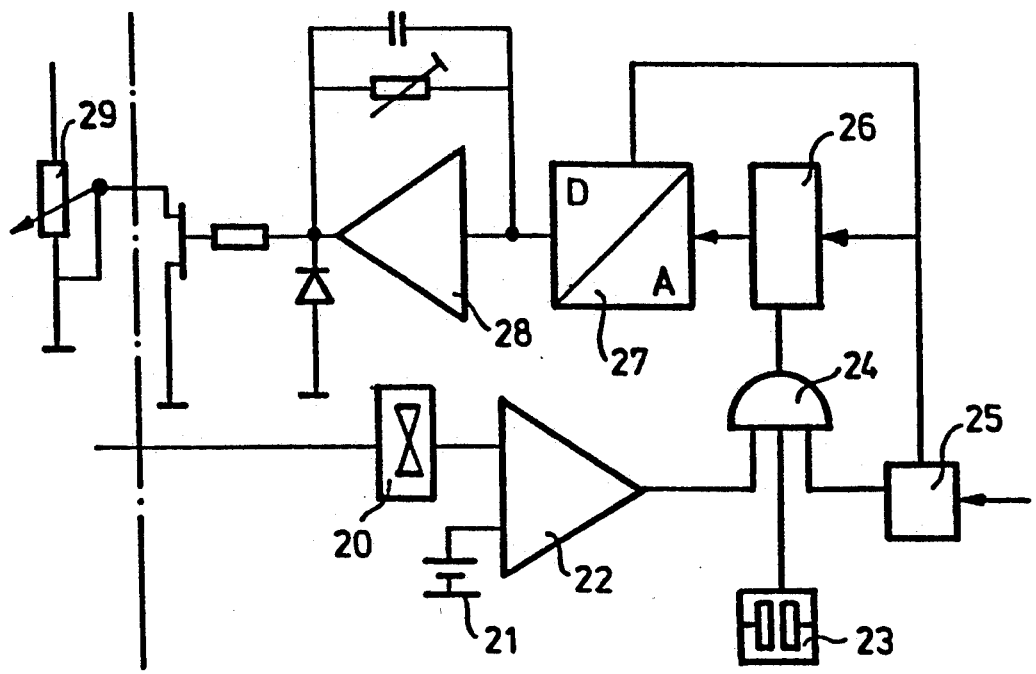
FIG. 6 is a circuit for adjusting the brightness of a picture monitor.

In order to eliminate aging phenomena on the picture tube of picture monitor 19 and to provide the possibility of adjusting the brightness of picture monitor 19 to the brightness of the first frame, a basic balancing of the brightnesses is performed, using the circuit shown in FIG. 6.

FIG. 6 shows a schematic of the brightness adjusting circuit that can be used for measuring the brightness of the monitor.

A photodiode 20 is pivoted in front of the image tube window of monitor 19 to balance the brightness, said diode detecting the light emitted by the monitor and converting it into an electrical signal fed to the input of a comparator 22. A standard voltage source 21 is connected to the other input of comparator 22, and the value of this source corresponds to the desired brightness level.

The output of comparator 22 is connected to one input of an AND gate 24, whose other inputs are connected with a timing oscillator 23 and with the output of a reset pulse generator 25. Reset pulse generator pulse 25 contains a release signal to initiate the operating cycle of the brightness adjustment after picture monitor 19 has warmed up.

During the measurement phase, a standard BAS signal is applied, composed of the image content signal, the scanning signal, and the synchronizing signal of a video camera.

The output of AND gate 24 is connected with the input of a counter, reset by the output pulse from reset pulse generator 25 and whose counting pulse generation is controlled by comparator 22. The output of counter 26 is connected to the input of a digital/analog converter 27, likewise reset by reset pulse generator 25. Depending on the particular counter setting, digital/analog converter 27 delivers an analog signal to a amplifier 28 connected downstream, controlling a brightness adjusting element 29 to adjust the picture tube brightness of picture monitor 19.

After the adjustment process is complete, photodiode 20, swung in front of picture monitor 19 is swung back, so that the image information delivered by picture monitor 19 can be projected unimpeded onto the motion-picture film.

When a second frame is superimposed onto the motion-picture film, a distinction is made between data reflection and full format superimposition. During data reflection, corresponding alphanumeric characteristics are superimposed onto the frame recorded by the taking optics of the motion-picture camera or instead of an additional frame, in full format superimposition an additional frame is projected in the manner described above onto the motion-picture film along with the frame taken via the taking optics of the motion-picture camera.

Both data reflection and partial frame superimposition as well as full format superimposition can take place as the film moves in front of the fixed film transport mechanism until it reaches the desired film speed and in synchronous mode, in other words when the desired number of frames per second is reached. In both types of operation, data are stored optically to be used for improved frame analysis as well as elimination of disturbing parameters.

Figure 7:
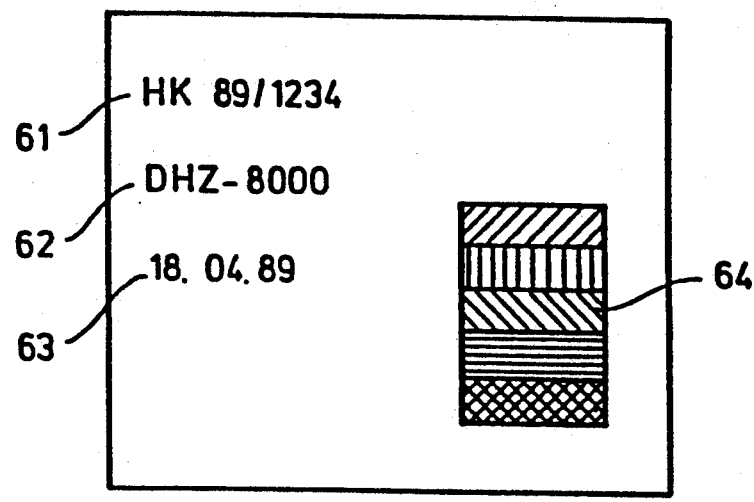
FIG. 7 and 8 are two different operating modes for showing data superimpositions.
Figure 8:
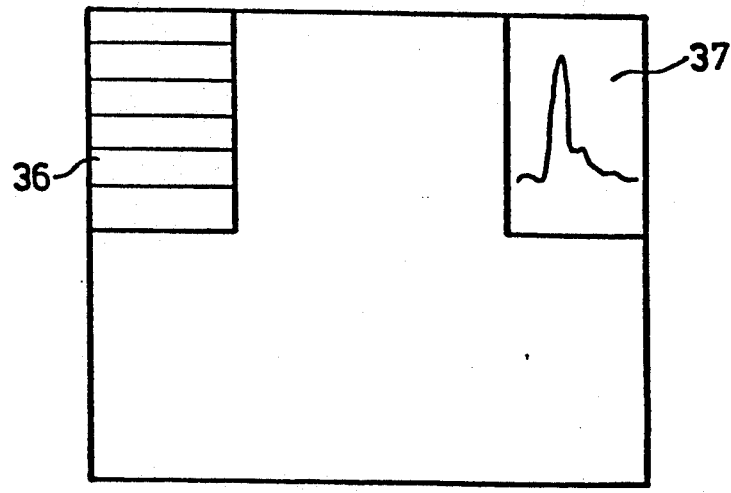

Several possibilities of partial and complete frame superimposition will now be described both in forward wind and in synchronous operation with reference to the operating modes in FIGS. 7 and 8 for data reflection, but they make no claim to completeness of all of the possibilities associated with additional frame superimposition.

According to a preferred embodiment, a standard 625/525-line monitor with circuit modifications is used as the reflecting source for data reflection. The start for each frame is at the upper left corner, accomplished with the aid of a DC deflecting amplifier, used instead of the usual AC voltage amplifier. The monitor is also controlled using video signals without frame content to maintain stable line synchronization, always with inserted line pulses.

Adaptation of monitor contrast to different types of film, x-rays for example, is accomplished by choosing preset potentiometers. In certain operating modes, a general increase in brightness and decrease in brightness are performed since in these operating modes for example only characters are reflected.

In data reflection, preferably a choice can be made between a normal-resolution data reflection with 625 lines for a complete frame and a high-resolution data reflection with 1000 lines for a complete frame. Basically three reflection modes are possible:

A. Mode 1 (FIG. 7)

In this type of data reflection, general data are applied to fill the frame in the film leader before taking x-ray pictures for example. The data for the superimposed information were supplied externally in a data type 1 through a signal bus before the motion-picture camera starts, to the data reflection generator, while in a data type 2 the externally supplied BAS signal is projected directly onto the film via data reflection after camera synchronous operation is reached without intermediate processing.

In data type 1, the data are entered by an external keyboard and data bus transmission is performed by means of a transfer protocol. This data protocol is processed in the data reflection bus, the information is stored intermediately in a data reflection controller, and after the motion-picture camera starts, it is projected onto the motion-picture film through the data reflection device.

During normal-resolution data reflection, resolution is at 60 characters per line with 20-character lines using the data reflection controller. Deflection of the data reflection image tube takes place at 625 lines per complete frame.

With high-resolution data reflection, the resolution is 80 characters per line with 40-character lines using the data reflection controller. Deflection of the data reflection image tube is at 1000 characters per complete frame.

In data type 2, an external video signal is supplied with standardized frame synchronization signals. The amplitude of the image signal directly influences the brightness of the data reflection monitor. Every other complete video image is projected with a frequency of 12.5 frames per second. For projection, for example, data generated by a central computer may be used.

B. Mode 2 (FIG. 8)

To perform this mode, the frame change pulse is given after 6 ms for each frame. The frame change synchronizing circuit is modified for this purpose in the existing monitor circuit for a pull range of 5 to 120 Hz.

In this type of data reflection, reflection of information takes place parallel, for example to an x-ray picture by means of the motion-picture camera with a two-frame time displacement in an rpm range of the motion-picture camera of 5 to 120 frames per second. The projection locations in this type of operation are the upper two corners of the frame as shown in FIG. 8.

In data group 1, reflection takes place at the upper left film corner with three to four character lines of 10 characters each. Information that can be superimposed is a continuous frame count, a hospital logo, a camera taking angle (front, side) right-left stereo separation, speed asynchronous markings, frame frequency, or a note.

For data group 2, projection takes place at the upper right corner of the film as a dot matrix for a symbolic representation of curves. The horizontal resolution is approximately 120 dots, the vertical resolution approximately 50 dots.

When using data reflection for hospital purposes, real-time information that might be included and superimposed includes for example a blood pressure curve or an EKG curve.

The time range shown is preadjustable and the real-time curve value is at the right-hand edge while the previous values are in the direction of the left-hand side of the frame.

C. Mode 3

This data reflection mode is provided for direct recording of an externally supplied video image. Depending on the operating speed of the motion-picture camera (12.5 frames per second or 25 frames per second), every other complete video image or every other video half frame is recorded. The synchronization signals for the camera operation are derived directly from the video synchronization signal. The video image is projected onto an area measuring approximately 18×23 mm.

Recording information can include for example frame processing, calculated project data, or a backup storage medium.

D. Mode 4

This type of operation permits checking the data reflection basic setting by presenting brightness-related video signals to the data reflection. Various types of tests can be provided.

For example the following data superimpositions can be made:

1. Multistage Brightness Superimposition

In this operating mode, various brightness levels are projected onto the edge of the frame on the motion-picture film; the above-described previous balancing of the image tube on the picture monitor to a standardized brightness is required with controlled BAS standard level. For this purpose a five stage gray wedge, for example, is projected at the edge of the frame, permitting evaluation of the subsequently projected frames and, after film development, permits evaluation of the film density on an image analyzer so that a determination can be made as to whether there were errors in the motion-picture camera, on the device that was used to generate the images such as an x-ray machine, or in the development of the motion-picture film.

2. Projection of Parameters

In this operating mode, both during preliminary operation and during synchronous operation of the motion-picture camera, specific data such as the date, time, place, and subject of the recording can be marked in a partial frame. For medical technical purposes, in this operating mode, one can have superimposition of data from the examining physician or the hospital where the examination was performed as well as specific patient data.

Data superimposition can be performed both on the frame previously exposed by the taking optics of the motion-picture camera and on a separate partial frame exposed at the same time as the first frame.

The alphanumeric data can be entered through the BAS signal or through a separate keypad. Thus for example a video camera can be pointed at a patient's data sheet to record patient-specific data or the treating physician and/or an assistant can enter patient-specific data as well as the time and place of the examination using a separate keypad.

3. Continuous Frame Counting

In this operating mode, the frames are successively numbered so that during subsequent frame processing, accurate searches can be conducted. In addition, this also makes it possible to subject certain frames to separate analysis and in this way derive special documentation for example.

4. Superimposition of Technical Data

In this type of operation, additional information such as for example the number of frames per second both at high speed and synchronous speed can be superimposed. This additional information is especially important for evaluating the motion-picture film, since from the change in the frames and the superimposed frames per second, an exact graph as a function of time for the recorded object can be obtained.

Another possibility for recording technical data is in the area of medical technology, for example pressure values and EKG parameters as well as curves in the form of pressure value curves and an EKG or from brain currents.

6. Recording Manipulated Frames

In this type of operation, frames that have been intermediately stored and processed wither manually or by a computer can be recorded directly onto the motion-picture film. In this manner it is possible, especially in synchronous operation, to store computer frames offering essential additional information especially in the field of the medical application of the motion-picture camera according to the invention.

This kind of use to prepare a computer x-ray picture as well as the operating modes described above will now be described with reference to the block diagram in FIG. 9.

Figure 9:
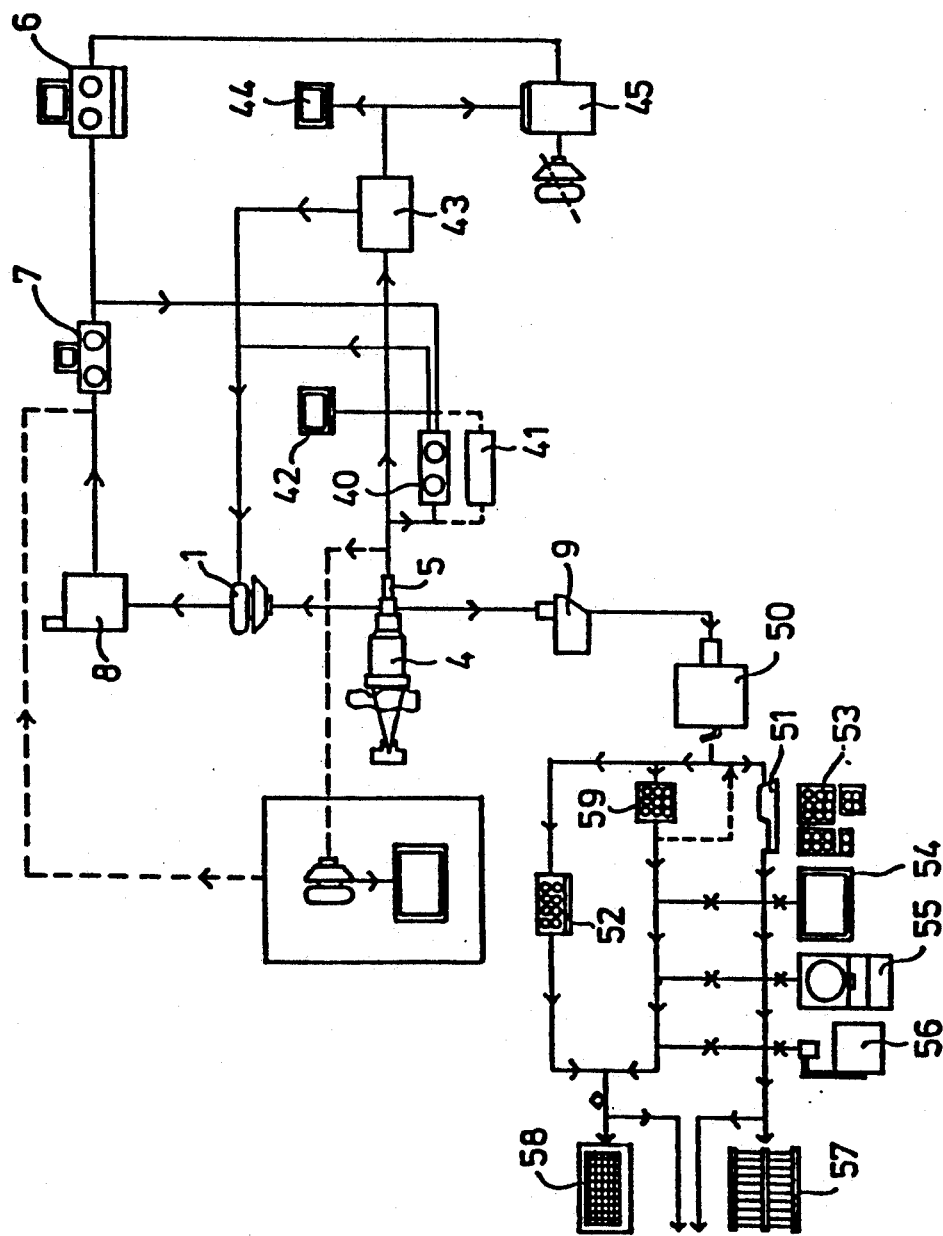
FIG. 9 is a block diagram for frame processing of the sequence of frames recorded with a motion-picture camera with complete frame and partial frame superimposition, in cardioangiography.

FIG. 9 is a block diagram of frame processing in angiocardiography using a motion-picture camera and superimposition of a second frame.

The taking lens of motion-picture camera 1 is connected to the screen of an x-ray machine 4, to which a video camera 5 is also connected. The signal output of video camera 5 is optionally connected to a video tape recorder 40, a video disk recorder 41, and/or a digital memory 43. The outputs of these memories 40, 41, and 43 are connected by a suitable line with the picture monitor of motion-picture camera 1 for superimposing a complete or partial frame in the manner described above. In addition, both disk recorder 41 and video tape recorder 40 can be connected to a monitor 42 as well as digital memory 43 with a monitor 44 and a multi-format documentation device for different sheet film formats 45.

The film taken from motion-picture camera 1 and exposed in the manner described above is developed in a developing machine 8 and inserted into a film projector 7 to view the frames, whereby film projector 7 simultaneously permits an analysis of the optical information stored on the motion-picture film. An analysis of this kind consists in optional superimposition of various data stored in the additional frames, a superimposition of individual frames, a frame by frame search, etc.

The output of film projector 7 for viewing the frame is optionally connected with video tape recorder 40, for example to produce film documentation via a video cassette for a treating family doctor and with an additional device for frame processing 6, permitting exact frame analysis and evaluation of the frames stored on the motion-picture film. The output of frame processing device 6 is connected with multi-format documentation device 45 for documentation and storage of various sheet film formats.

In addition to the frame processing described above, it is also possible to create documentation using video camera 5 and a scanner 9 connected to video camera 5, which generates a 100 mm sheet film. Alternative cameras, for example with 105 mm roll film or 70 mm sheet film, can also be connected. The resultant films are developed in a developing machine 50 and then archived or supplied to film viewers.

Thus, the developed frames can be used in a film archiving device 51 to produce archive cards 53 that can be viewed or projected in a viewing box 54 or a film projector 55 or an overhead projector 56 before they are stored in a large format film archive or to a referring physician. Similarly, sample trays 59 can be prepared and stored in film bags for 100 mm pictures 58 or sent to the referring physician and viewed there or in a film viewer for 100 mm pictures 52.

The above description of an embodiment of the application of additional frame information prepared in a motion-picture camera with partial or full format superimposition should be viewed only as an example and can be supplemented by any other examples.

The invention is not limited in its design to the preferred embodiment described above. Instead, a number of variations are possible, using the solution described even when the designs are basically different.

We claim:

1. A motion-picture camera comprising taking optics for projecting frames onto a motion-picture film, a film transport mechanism for moving said film along a film path, and a frame projection device disposed in the vicinity of the film path, said frame projection device being located directly in front of or behind said taking optics a distance essentially corresponding to the format of frames for optional projection of at least a partial frame spaced directly in front of or behind the frame to be projected by said taking optics onto said motion-picture film.

2. A motion-picture camera according to claim 1 and further including means for projecting an additional frame or partial frame in each film transport step onto said motion-picture film.

3. A motion-picture according to claim 1 or 2 and further including means for superimposing a partial frame onto the frame projected by said taking optics onto motion-picture film.

4. A motion-picture camera comprising first taking optics for projecting frames onto a motion-picture film, a film transport mechanism for moving said film along a film path past said first taking optics, and a frame projection device located directly along said film path and spaced from said first taking optics, said frame projection device comprising second taking optics and a beam guide system for projecting a frame essentially corresponding to the format of said frames for superposition of at least a partial frame spaced directly in front of or behind the frame projected by of first taking optics onto said motion-picture film, and means for projecting said additional frame or partial frame onto said motion-picture film in each film transport step.

5. A motion-picture camera according to claim 4 wherein said frame projection device includes a picture monitor, and said beam guide system is located between said monitor and the location of said film path.

6. A motion-picture camera according to claim 5 wherein said beam guide system contains first and second deflecting mirrors and a lens, said first mirror projecting the image received from said picture monitor onto said lens, whence the image is deflected to said second mirror, said second mirror being disposed between said lens and said film path and said additional frame being projected onto said film at a point in front of or behind the frame projected by said first taking optics onto said motion-picture film.

7. A motion picture camera according to claim 4 or 5 wherein said beam guide system includes an optical fiber bundle with entrance optics and exit optics, said exit optics being located in the vicinity of movement elements of said film transport mechanism.

8. A motion-picture camera according to claim 5 and further including electrical lead means connecting said picture monitor with a taking device preferably consisting of a video camera.

9. A motion-picture camera according to claim 8 and further including a video tape recorder, disk recorder, and/or digital memory located between said video camera and said picture monitor.

10. A motion-picture camera according to claim 5 or 8 and further including a balancing circuit for adjusting the brightness of said picture monitor, said balancing circuit including a comparator that has first and second inputs and an output, a timing oscillator, a counter, a brightness adjusting element, a digital/analog converter, an amplifier, and a photodiode, said photodiode being mechanically swivelable in front of said picture monitor, the output of said diode being connected to said first input of said comparator, said second input being connected to a standard voltage source and said comparator output being connected together with the output of said timing oscillator to an input of said counter, said counter being resettable to trigger the balancing process, the output of said counter controlling said brightness adjusting element for said picture monitor via said digital/analog converter and said amplifier, said brightness adjusting element being subjected directly to the BAS signal composed of an image content signal, a scanning signal, and a synchronizing signal from said taking device.

11. A motion-picture camera according to claim 1 or 4 and further including means for superimposing alphanumeric information onto a partial image of motion-picture film during the high-speed phase of said film transport mechanism before motion-picture film reaches its specified speed and during synchronous operation of motion-picture film at said specified speed.

* * * * *